United States Patent
Silvester

(10) Patent No.: US 7,085,945 B2
(45) Date of Patent: Aug. 1, 2006

(54) USING MULTIPLE THERMAL POINTS TO ENABLE COMPONENT LEVEL POWER AND THERMAL MANAGEMENT

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 511 days.

(21) Appl. No.: 10/350,712

(22) Filed: Jan. 24, 2003

(65) Prior Publication Data

US 2004/0148528 A1    Jul. 29, 2004

(51) Int. Cl.
*G06F 1/32*    (2006.01)
(52) U.S. Cl. ...................................... 713/320; 713/324
(58) Field of Classification Search ................ 713/300, 713/320, 322–324, 501, 601
See application file for complete search history.

(56) References Cited

U.S. PATENT DOCUMENTS

| | | | | |
|---|---|---|---|---|
| 5,721,837 A | * | 2/1998 | Kikinis et al. ............... | 710/303 |
| 5,798,918 A | * | 8/1998 | Georgiou et al. ............. | 700/28 |
| 6,047,248 A | * | 4/2000 | Georgiou et al. ........... | 702/132 |
| 6,363,490 B1 | * | 3/2002 | Senyk ........................ | 713/300 |
| 6,826,705 B1 | * | 11/2004 | Tani ............................ | 713/320 |
| 6,889,332 B1 | * | 5/2005 | Helms et al. ................ | 713/322 |
| 2004/0128100 A1 | * | 7/2004 | Rotem ........................ | 702/136 |

* cited by examiner

*Primary Examiner*—Dennis M. Butler
(74) *Attorney, Agent, or Firm*—David N. Tran

(57) ABSTRACT

A component in a computer includes multiple functional unit blocks (FUB). Each FUB may be associated with a sensor and may be managed individually. When the sensor detects that a problem associated with a particular FUB may arise, a controller may be used to adjust operation of the FUB instead of operation of the entire component.

22 Claims, 11 Drawing Sheets

USING MULTIPLE THERMAL POINTS TO ENABLE COMPONENT LEVEL POWER AND THERMAL MANAGEMENT

FIELD OF THE INVENTION

The present invention relates to the field of computing systems, more particularly relating to methods and apparatus for component management including one or more of thermal management, performance management, and power management.

BACKGROUND

Designers of computing systems such as, for example, mobile computer systems, are faced with a delicate balance. They seek to increase performance of the computer systems but at the same time control power consumption and temperature caused by components of the computer systems. The components may include, for example, a processor, chipsets, etc.

Typically, a processor has a discrete operating point, characterized by a given frequency and power. The frequency may be some multiple of an external clock delivered to the processor. The power consumed by the processor may be a function of the frequency and voltage applied to the processor. As the voltage level is increased, the frequency may be increased, resulting in a nonlinear increase in power consumption. An increase in the power consumption may cause an increase in temperature. When the temperature is too high, the processor may fail. Typically, to decrease the temperature, the voltage and frequency pair may be adjusted to decrease the power consumption of the processor.

Similarly, chipsets may receive clock signals and may operate at a certain frequency. During normal operation, the chipsets may cause a rise in temperature, and when the temperature is too high, operation of the chipsets may also fail. More recent chipsets may include a mechanism (e.g., throttling) to lower the clock-frequency to control the temperature generated by the chipsets. In addition to adjusting the frequency, heat sinks, airflows or combinations of heat sinks and airflows may also be used as thermal solutions to control the temperature generated by the chipsets and by the processor.

Although the above techniques provide some forms of thermal solutions, one common theme among them is that the solutions apply to the entire component (e.g., processor) at the expense of the performance of the component as a whole, and thus may not be efficient.

BRIEF DESCRIPTION OF THE DRAWINGS

The following drawings disclose various embodiments of the present invention for purposes of illustration only and are not intended to limit the scope of the invention.

DETAILED DESCRIPTION

In one embodiment, a method for monitoring multiple functional unit blocks (FUB) of a component is disclosed. Each FUB may be associated with a sensor. When the sensor detects that operation of a particular FUB may be affected, a controller associated with the FUB may perform appropriate adjustment relating to the FUB.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

Modern computer components (e.g., processors, chipsets, etc.) are designed with increasing frequency and power density for higher performance. Their performance may be limited by the amount of heat that can be extracted using the available cooling technology or power/frequency throttling techniques. Typically, each of the computer components may have multiple FUBs. Each FUB may perform a different function and may potentially be a hot spot of the component when the FUB reaches a certain thermal point. Currently, when a FUB becomes a hot spot, power throttling is applied to the entire component to reduce the temperature of the entire component.

Figure 1A:
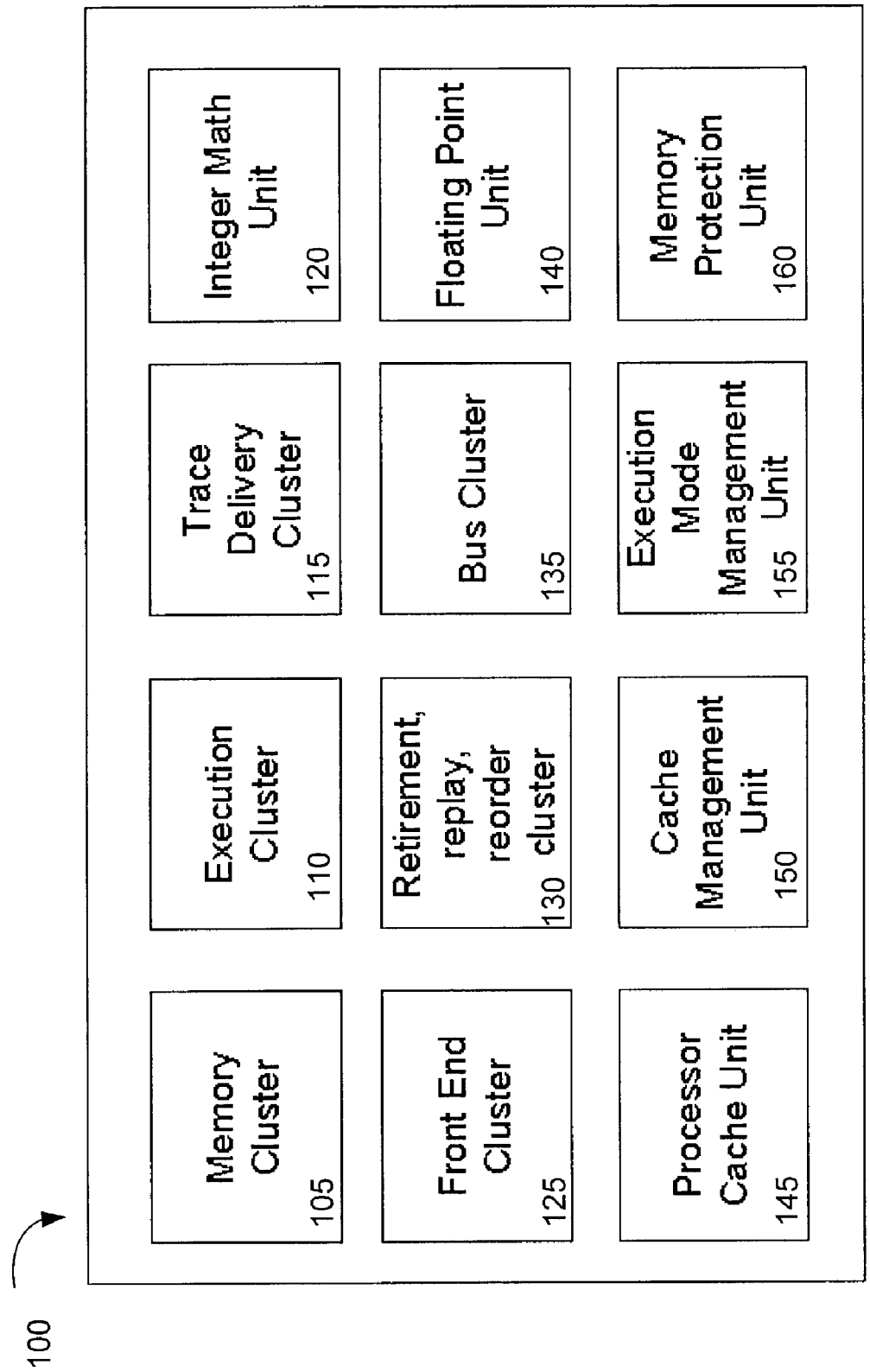
FIG. 1A is a block diagram that illustrates an example of the functional unit blocks (FUBs) of a processor.
Figure 1B:
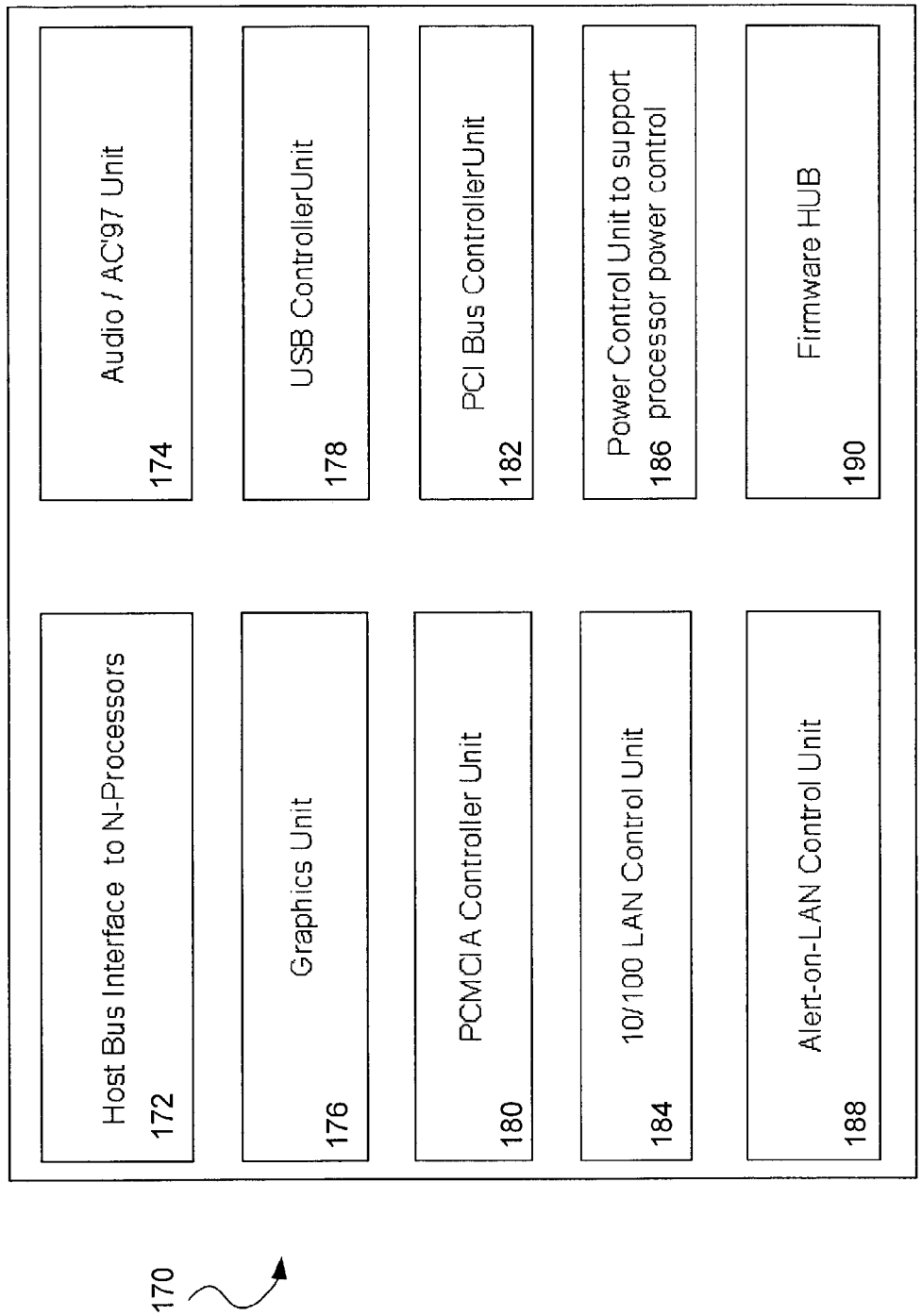
FIG. 1B is a block diagram that illustrates an example of the FUBs of a chipset.

FIG. 1A is a block diagram that illustrates an example of the FUBs of a processor. The processor 100 may include, for example, the following FUBs: a memory cluster 105, an execution cluster 110, a trace delivery cluster 115, an integer math unit 120, a front end cluster 125, a retirement, replay, reorder cluster 130, a bus cluster 135, a floating point unit 140, a processor cache unit 145, a cache management unit 150, an execution mode management unit 155, and a memory protection unit 160. There may be other FUBs on the processor 100 depending on the processor implementation. FIG. 1B is a block diagram that illustrates an example of the FUBs of a computer chipset. The chipset 170 may include, for example, the following FUBs: a host bus interface 172, an audio interface unit 174, a graphics unit 176, a universal serial bus (USB) controller unit 178, a personal computer memory card international association (PCMCIA) controller unit 180, a peripheral component interconnect (PCI) bus controller unit 182, a local area network (LAN) control unit 184, a power control unit 186, an alert-on-LAN control unit 188, and a firmware HUB 190. There may be other FUBs on the chipset 150 depending on the chipset implementation. Functions of each of the FUBs on the processor 100 and on the chipset 150 are known to one skilled in the art.

Figure 2A:
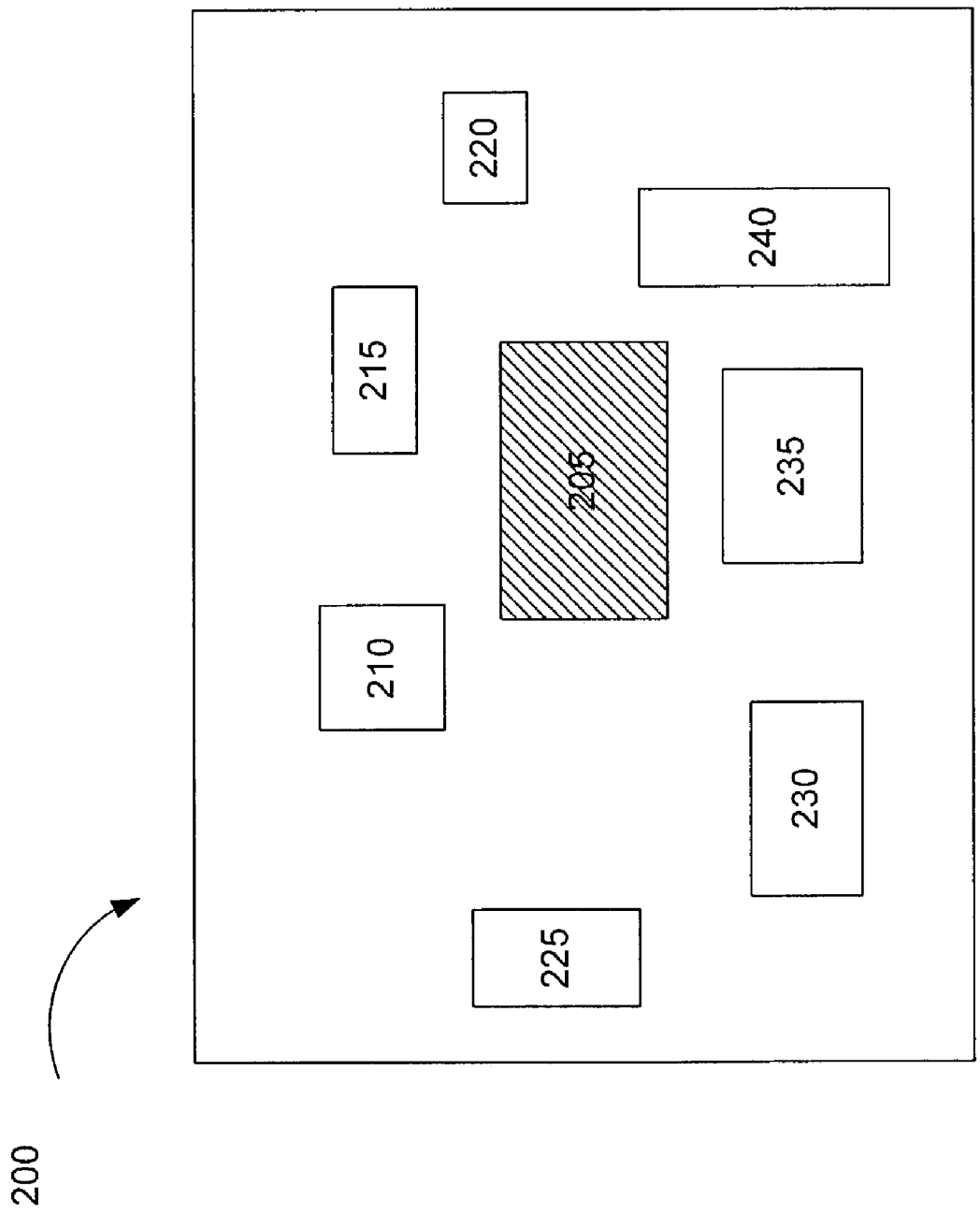
FIG. 2A is a block diagram illustrating an example of a component with its FUBs.

FIG. 2A is a block diagram illustrating an example of a component with its multiple FUBs. The arrangement of the FUBs in a component may be decided by the component designers and may vary from one component to another due to various design goals such as, for example, performance, size, cost, etc. In this example, component 200 may include eight FUBs 205–240 arranged as illustrated. Typically, when the FUB 205 (illustrated as shaded) becomes a hot spot (e.g., high temperature), the voltage and/or frequency applied to the entire component 200 may be throttled. The result of the throttling activity may include reduction of power consumption by the component 200. The throttling activity may reduce the temperature and performance of the FUB 205. The throttling activity may also reduce the temperature and performance of the other FUBs 210–240 of the component 200. This may occur even though the FUBs 210–240 may not be hot spots.

For another embodiment, each of the eight FUBs 205–240 may be associated with a sensor (not shown) to monitor its operating condition. There may be a different sensor for each FUB. Alternatively, two or more FUBs may share the same sensor. For one embodiment, each of the eight FUBs 205–240 of the component 200 may be managed independently of the other FUBs. Managing the FUBs may include, for example, monitoring and throttling the operating condition of the FUBs. For example, a sensor may monitor and send operating condition information of a FUB to a controller, and when necessary the controller may throttle the power and/or the frequency applied to the FUB. Managing the FUB may also include performing other operations that may help controlling the operating condition of the FUB. It may be noted that a component may only have one FUB. In this case, managing the only FUB is similar to managing the entire component.

For example, when the sensor associated with the FUB 205 is a thermal sensor, and it detects that the temperature of the FUB 205 violates a certain temperature threshold, appropriate actions may be taken to reduce the temperature of the FUB 205. This may include, for example, throttling the applied voltage and/or frequency or adjusting the power applied to the FUB 205. The temperature threshold may be predetermined, or it may be determined dynamically. Being able to independently manage the FUB 205 may enable the neighboring FUBs 210–240 to continue to operate at their normal levels of performance.

It may be noted that when the component 200 is a processor, the component 200 may also include multiple execution cores and other manageable resources on the same silicon die. For example, the component 200 may be a processor that supports Hyperthreading Technology (HT) to provide multithreading and parallel execution capabilities. Hyperthreading Technology is developed by Intel Corporation of Santa Clara, Calif. In this example, the processor that supports HT may include multiple execution cores (or logical processors) on the same processor die. Each of these execution cores and resources may also be managed individually as a FUB to enable better management of its operating condition. Other components in the computer system may also be managed based on their FUBs using the techniques described herein.

Figure 2B:
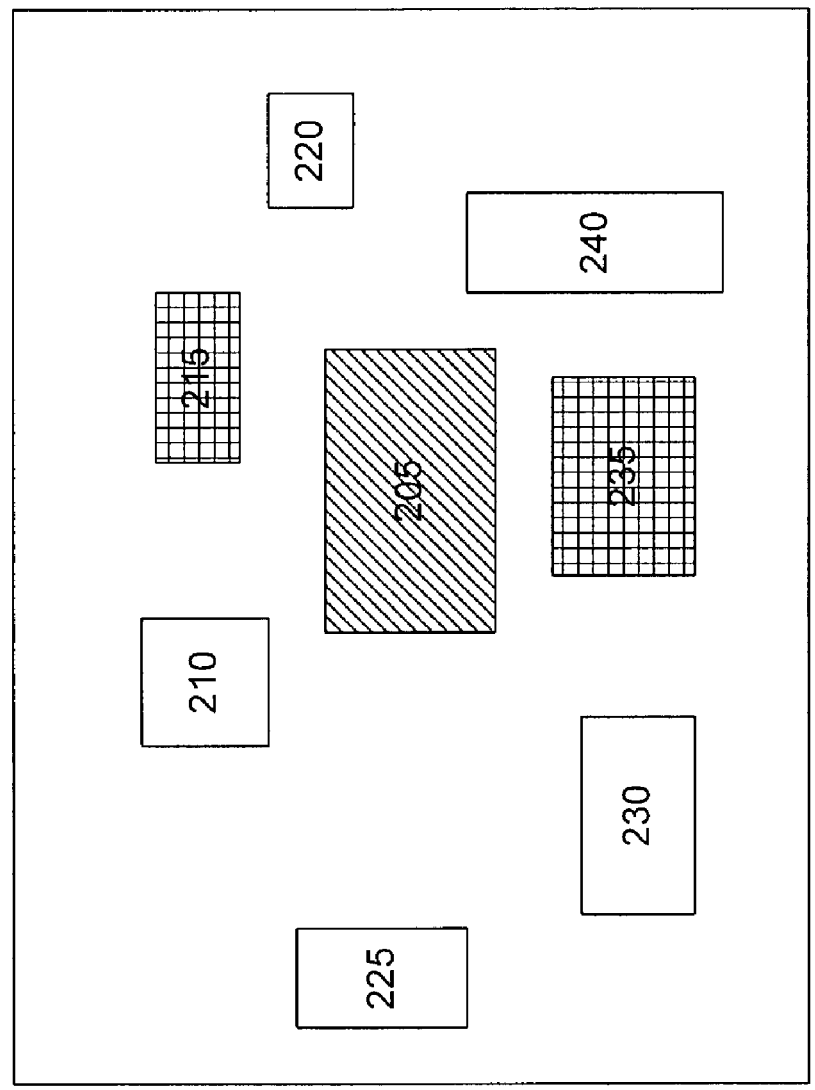
FIG. 2B is a block diagram illustrating an example of a component with a FUB that may not be throttled.

FIG. 2B is a block diagram illustrating an example of a component with a FUB that may not be throttled. The component 200 illustrated in FIG. 2B is similar to the component illustrated in FIG. 2A. There may be situations when it may not be desirable to throttle the operating condition of a particular FUB even though the sensor associated with that FUB may detect that its operating condition may violate a threshold. For example, the temperature of the FUB 205 may be higher than a predetermined temperature threshold. However, because the FUB 205 may be performing a critical operation, throttling its power may not be desirable. For one embodiment, the throttling activity may be applied to one or more of the neighboring FUBs of the FUB 205. In this example, the power applied to the FUBs 215 and 235 (illustrated as shaded) may be reduced because that may indirectly help reducing the temperature of the FUB 205.

Figure 2C:
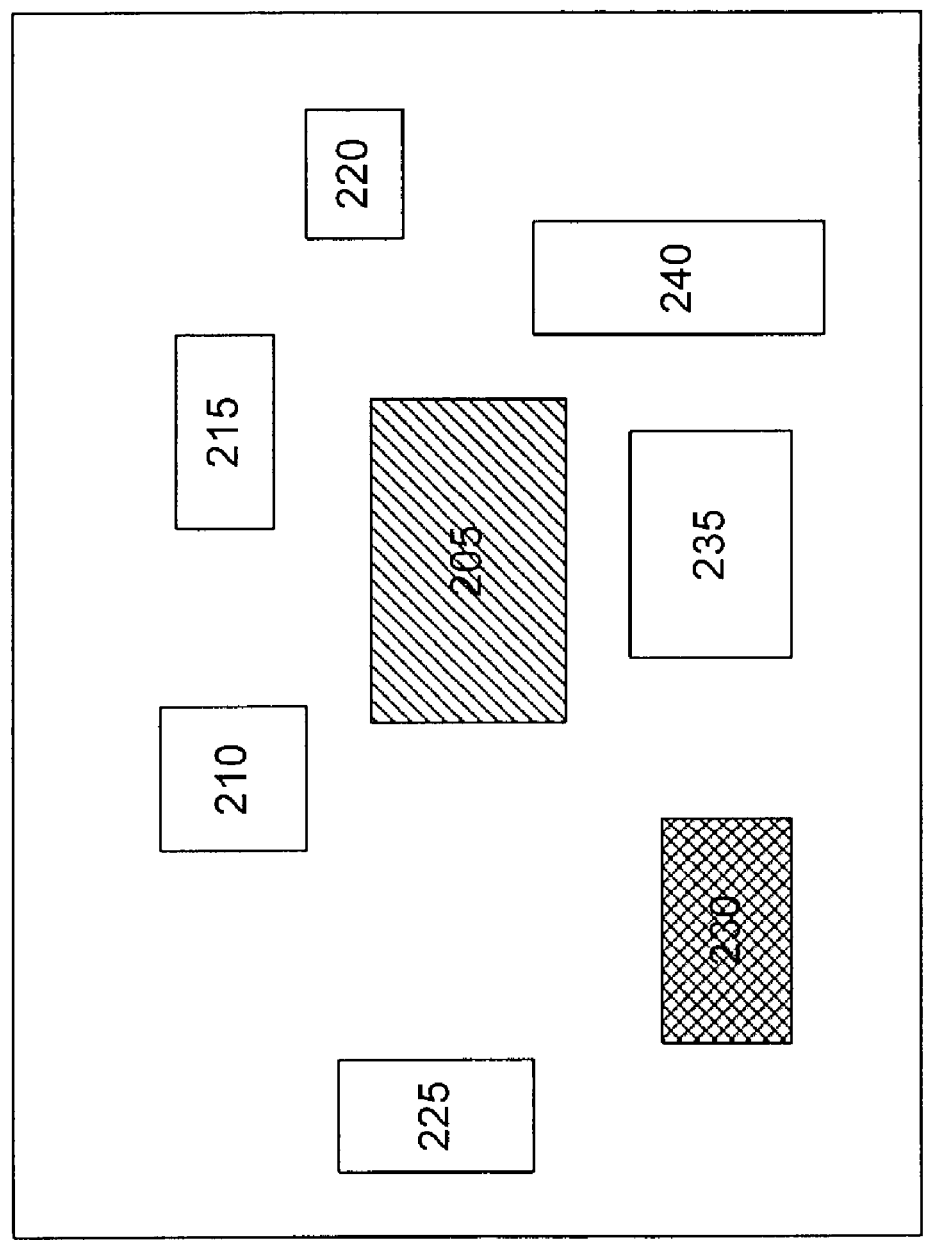
FIG. 2C is a block diagram illustrating an example of a component having dependent FUBs.

FIG. 2C is a block diagram illustrating an example of a component having a FUB that depends on another FUB. There may be situations when the operation of one FUB may depend on the operation of one or more other FUBs. The FUB having its operation depending on the operation of another FUB may be referred to as a dependent FUB. The FUB having its operation not depending on the operation of another FUB may be referred to as an independent FUB. A dependent FUB may or may not be positioned adjacent to its corresponding independent FUB. For example, referring to FIG. 2C, the FUB 205 may be an independent FUB and the FUB 230 (illustrated as shaded) may be a dependent FUB that depends on the FUB 205. For one embodiment, when a throttling activity is applied to the FUB 205, another throttling activity may need to be applied to the FUB 230. This may allow the dependent FUB 230 to continue to operate even when its corresponding independent FUB 205 is being throttled. It may be noted that in this example the dependent FUB 230 may operate with reduced power.

Figure 3A:
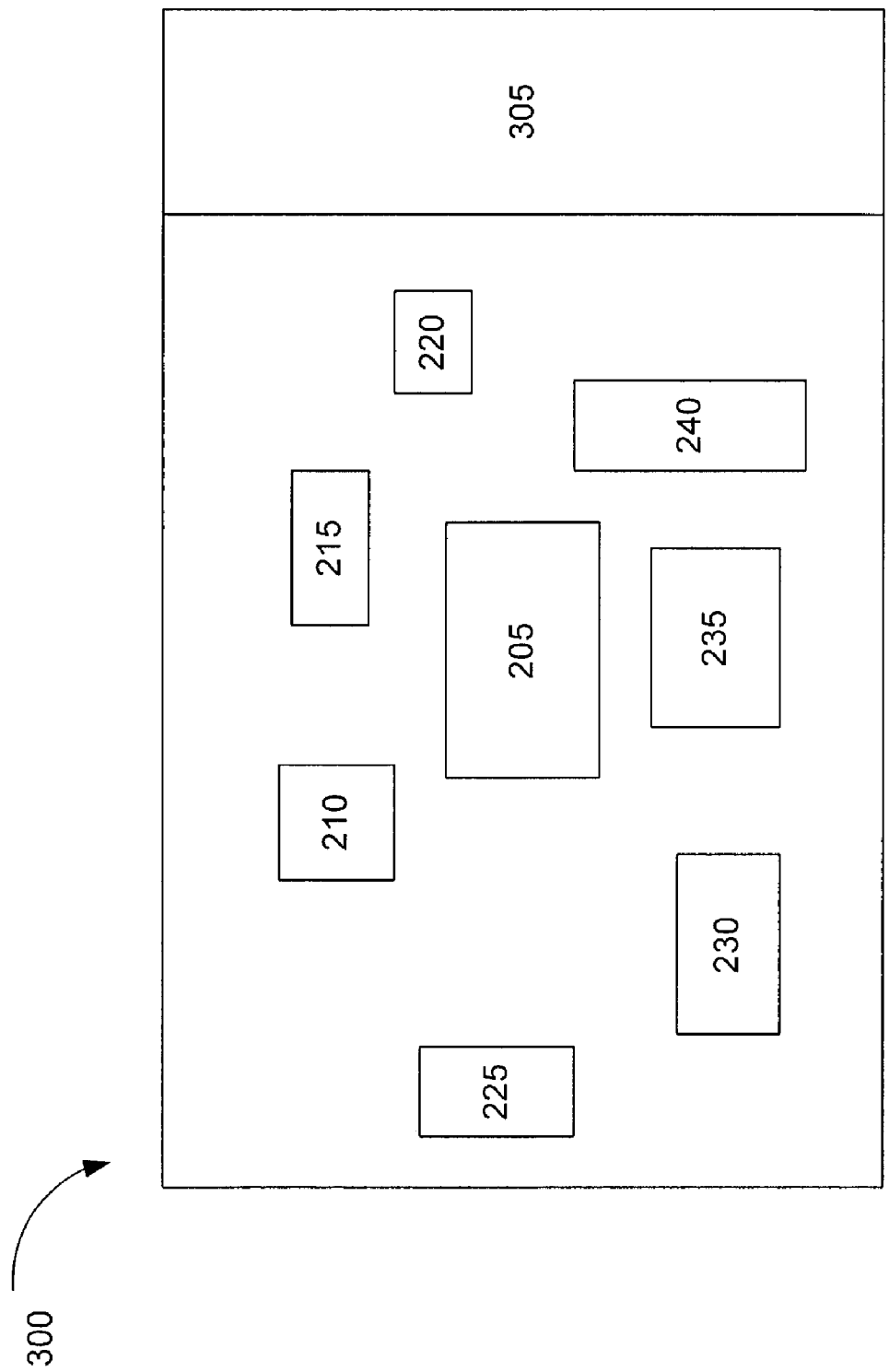
FIG. 3A is a block diagram illustrating an example of a controller associated with a component having multiple FUBs.

FIG. 3A is a block diagram illustrating an example of a controller associated with a component having multiple FUBs. The component 300 illustrated in FIG. 3A includes similar FUBs 205–240 as those illustrated in FIG. 2A. Controller 305 may be used to manage the operating condition of the multiple FUBs 205–240. For one embodiment, the controller 305 and the component 300 may be on the same die. The controller 305 may receive the operating condition information of the FUBs 205–240 from the different sensors associated with each of the FUBs 205–240. The controller 305 may also include one or more signal lines (not shown) connecting to each of the FUBs 205–240. The signal lines may be used by the controller 305 to throttle the operating condition of each of the FUBs 205–240. Throttling may be applied to, for example, one or more of frequency, voltage, thermal, power, and performance of a particular FUB.

Figure 3B:
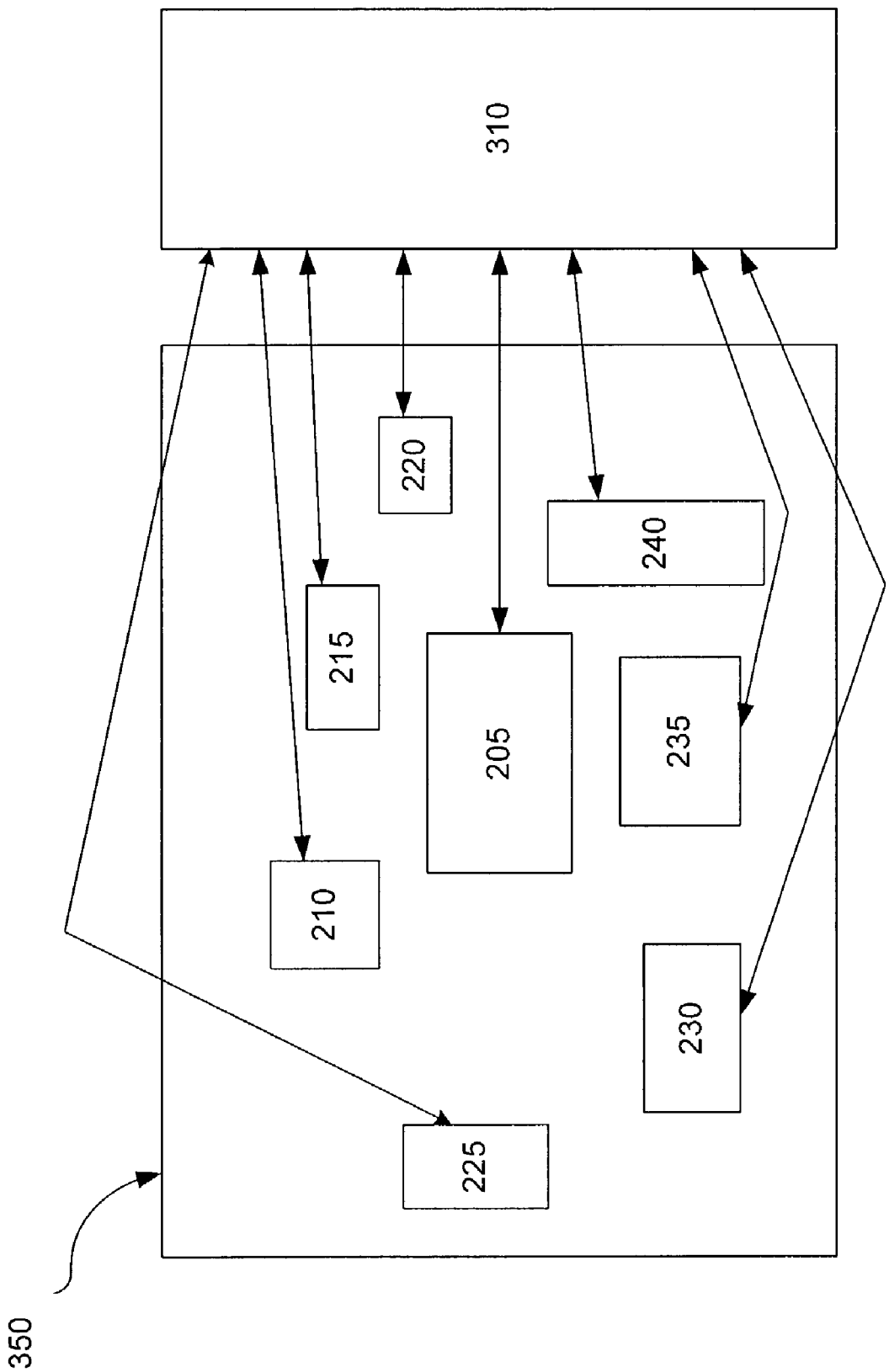
FIG. 3B is a block diagram illustrating an example of a controller being separate from a component that has multiple FUBs.

FIG. 3B is a block diagram illustrating an example of a controller being separate from a component that has multiple FUBs. Component 350 illustrated in FIG. 3B includes similar FUBs 205–240 as those illustrated in FIG. 3A. Controller 310 in this example performs similar functions as the controller 305 illustrated in FIG. 3A. For one embodiment, the controller 310 and the component 350 may be on separate dies. In this example, the signal lines connecting between the different FUBs 205–240 to the controller 310 are shown as bi-directional arrows to illustrate that they may be used by the sensors to send operating condition information to the controller 310, and that the same signal lines may also be used by the controller 310 to send control information to the different FUBs 205–240. It may be noted that there may be different signal lines for the controller 310 to receive operating condition information from the FUBs 205–240 and to send control information to the FUBs 205–240.

It may be noted when the controller is on the same die as the component (as illustrated in FIG. 3A) the reaction time to temperature aspects of the FUBs of the component may be faster than when the controller is not on the same dies as the component (as illustrated in FIG. 3B). When the component is a processor, the controller may be included in a chipset adjacent to the processor and may be responsible for monitoring and controlling the thermal characteristics of the processor. It may be possible to monitor and control the thermal characteristics of the processor in a more general and flexible manner using software application running with an operating system. This flexibility may result in better processor performance.

For one embodiment, inputs from each FUB of the component may be viewed as a bit setting indicating their respective condition. For example, in the case where the controller is external to the component, the component may export status information from each FUB in the form of a data packet, perhaps using multiple bits to represent the status information for each FUB. For example, it may be possible to use two (2) bits to represent the status information. Other number of bits may also be used for different levels of control. In the current example, the component has four (4) FUBs, and two (2) bits are used to define the different possible status information, as shown in the following table.

| FUB # in Component | Bits | Definition |
|---|---|---|
| 1 | 0–1 | 00 = Normal |
|   |     | 01 = Hot |
|   |     | 10 = Reserved |
|   |     | 11 = Critical Hot |
| 2 | 2–3 | 00 = Normal |
|   |     | 01 = Hot |
|   |     | 10 = Reserved |
|   |     | 11 = Critical Hot |
| 3 | 4–5 | 00 = Normal |
|   |     | 01 = Hot |
|   |     | 10 = Reserved |
|   |     | 11 = Critical Hot |
| 4 | 6–7 | 00 = Normal |
|   |     | 01 = Hot |
|   |     | 10 = Reserved |
|   |     | 11 = Critical Hot |

The example table above shows that each FUB may have a "Normal" operating mode, a "Hot" mode where some action is required, and a "Critical Hot" where immediate action is required. Immediate action may include shutting down the component, or the component may result in damage. The bit settings may be defined to indicate more exact temperatures of each FUB, as measured in Celsius degrees, for example. Each FUB may have a different thermal point or operating threshold at which adjusting or corrective action may need to be taken.

Figure 4:
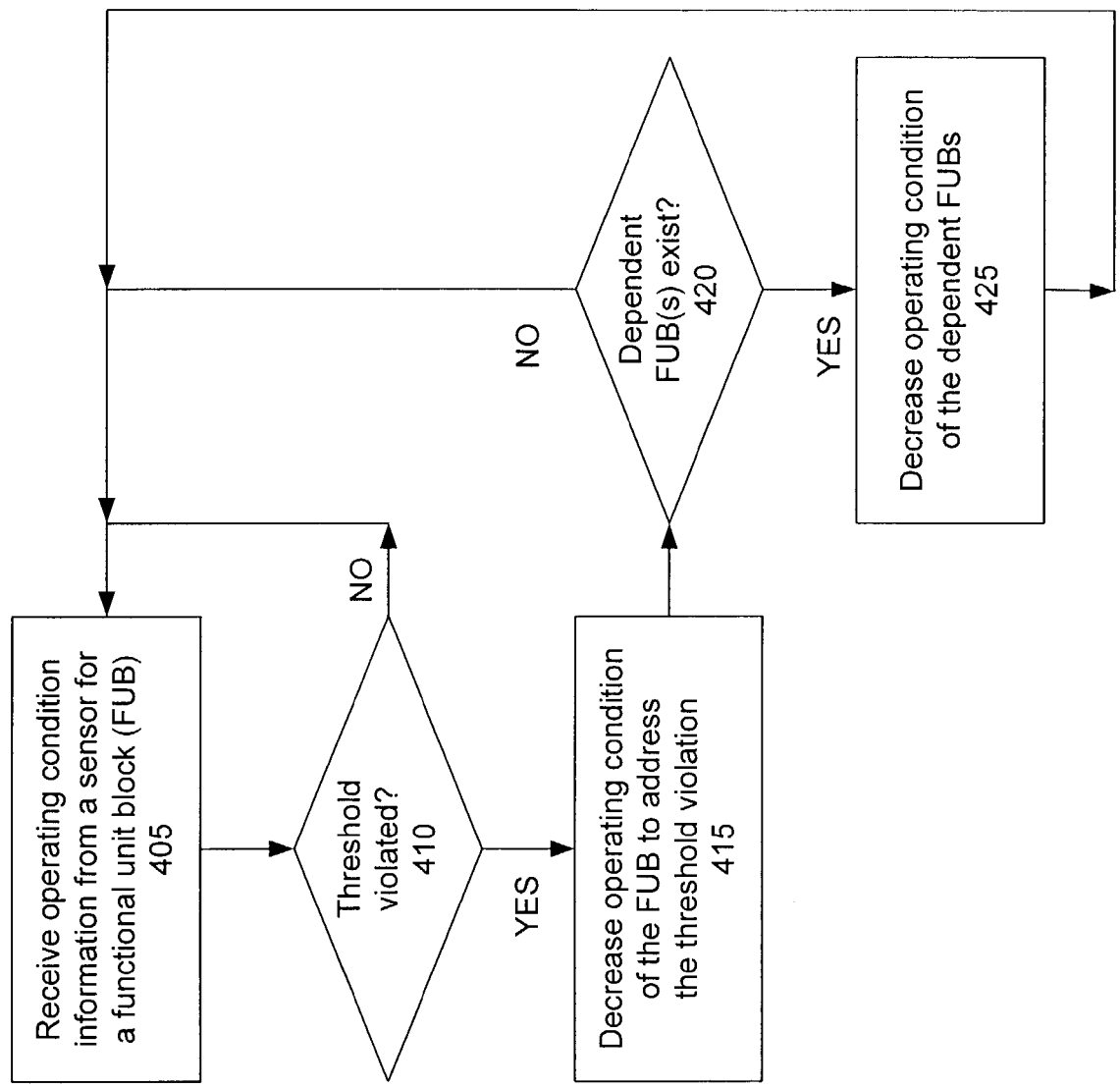
FIG. 4 is a flow diagram illustrating an example of a process used to manage operation of a FUB that may have dependent FUBs, according to one embodiment.

FIG. 4 is a flow diagram illustrating an example of a process used to manage operating condition of a FUB that may have a dependent FUB, according to one embodiment. The process may be performed by a controller such as, for example, the controller 310 illustrated in FIG. 3B. At block 405, the controller receives operating condition information of a FUB from a sensor. The operating condition information may be, for example, temperature information. Based on the operating condition information, a test is made to determine if a threshold is violated, as shown in block 410. The threshold may be, for example, a temperature threshold. When the threshold is not violated (e.g., the temperature does not exceed the temperature threshold), the process flows to block 405, and the controller continues to receive updated operating condition information from the sensor.

When the threshold is violated, the process flows from block 410 to block 415 where the controller may perform one or more operations to adjust the operating condition of the FUB. This may include, for example, decreasing one or more of frequency, voltage, thermal, power, and performance throttling of the FUB. At block 420, a test is made to determine if there exists any dependent FUB. When there is a dependent FUB, the process flows from block 420 to block 425 where the operating condition of the dependent FUB may also be decreased. When there is no dependent FUB, the process continues at block 405 where the controller receives updated operating condition information from the sensor.

Figure 5:
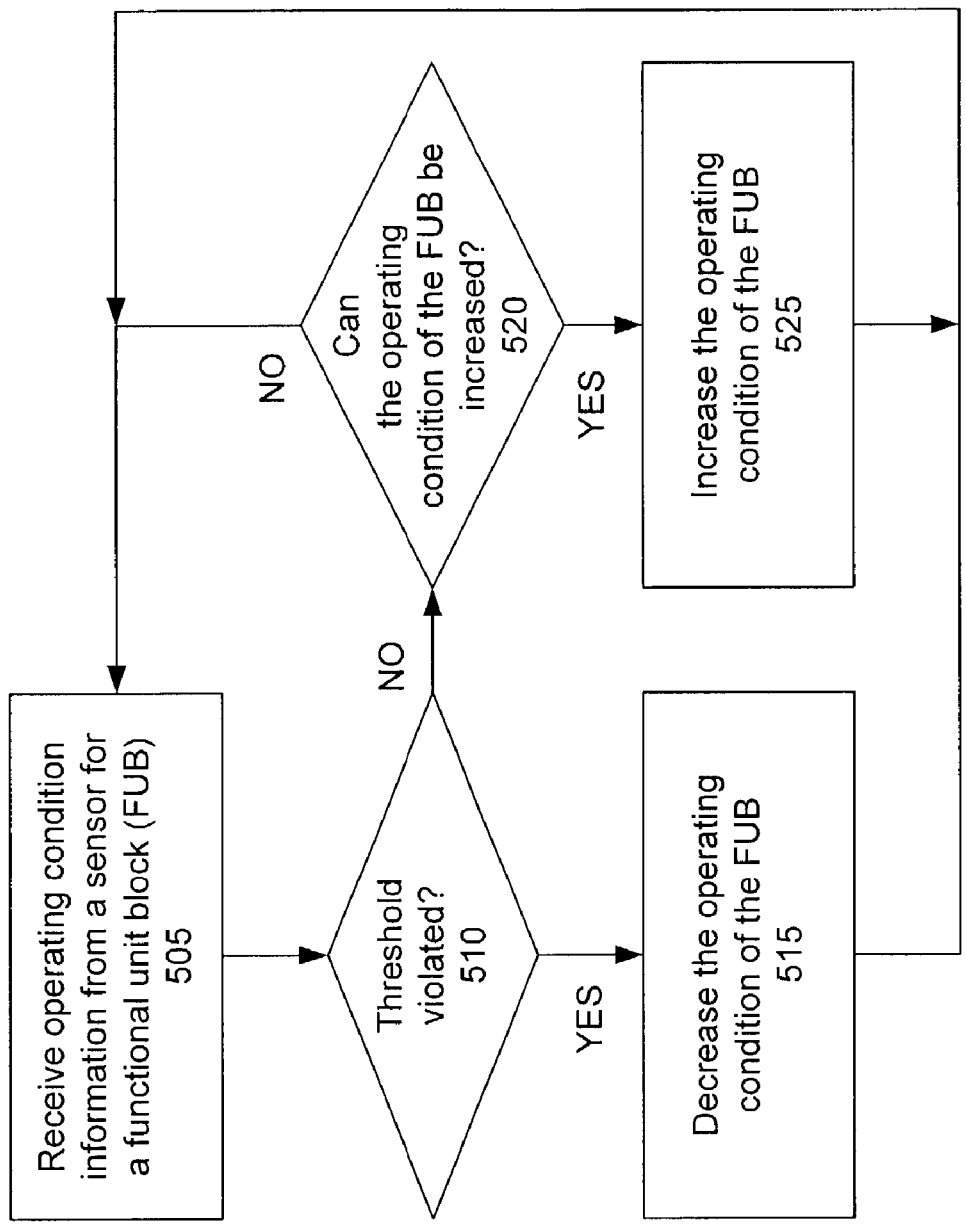
FIG. 5 is a flow diagram illustrating an example of a process used to manage operation of a FUB that may include decreasing or increasing operation of the FUB, according to one embodiment.

FIG. 5 is a flow diagram illustrating an example of a process used to manage operating condition of a FUB that may include decreasing or increasing operating condition of the FUB, according to one embodiment. The process may be performed by a controller as described above. At block 505, the controller receives operating condition information of a FUB from a sensor. Based on the operating condition information, a test is made, to determine if a threshold is violated, as shown in block 510. When the threshold is violated, the operating condition of the FUB is decreased, as shown in block 515. When the threshold is not violated, the process flows to block 520 where another test is made to determine if the operating condition of the FUB may be increased. For example, the FUB may previously experienced high temperature, and its operating condition may as a result have been decreased. At block 520, when the operating condition of the FUB may not be increased (e.g., the temperature of the FUB may not be cool long enough), the process flows from block 520 to block 505. When the operating condition of the FUB may be increased, the process flows from block 520 to block 525 where the controller performs one or more operations to increase the operating condition of the FUB. The process continues at block 505 where the controller receives updated operating condition information from the sensor.

Figure 6:
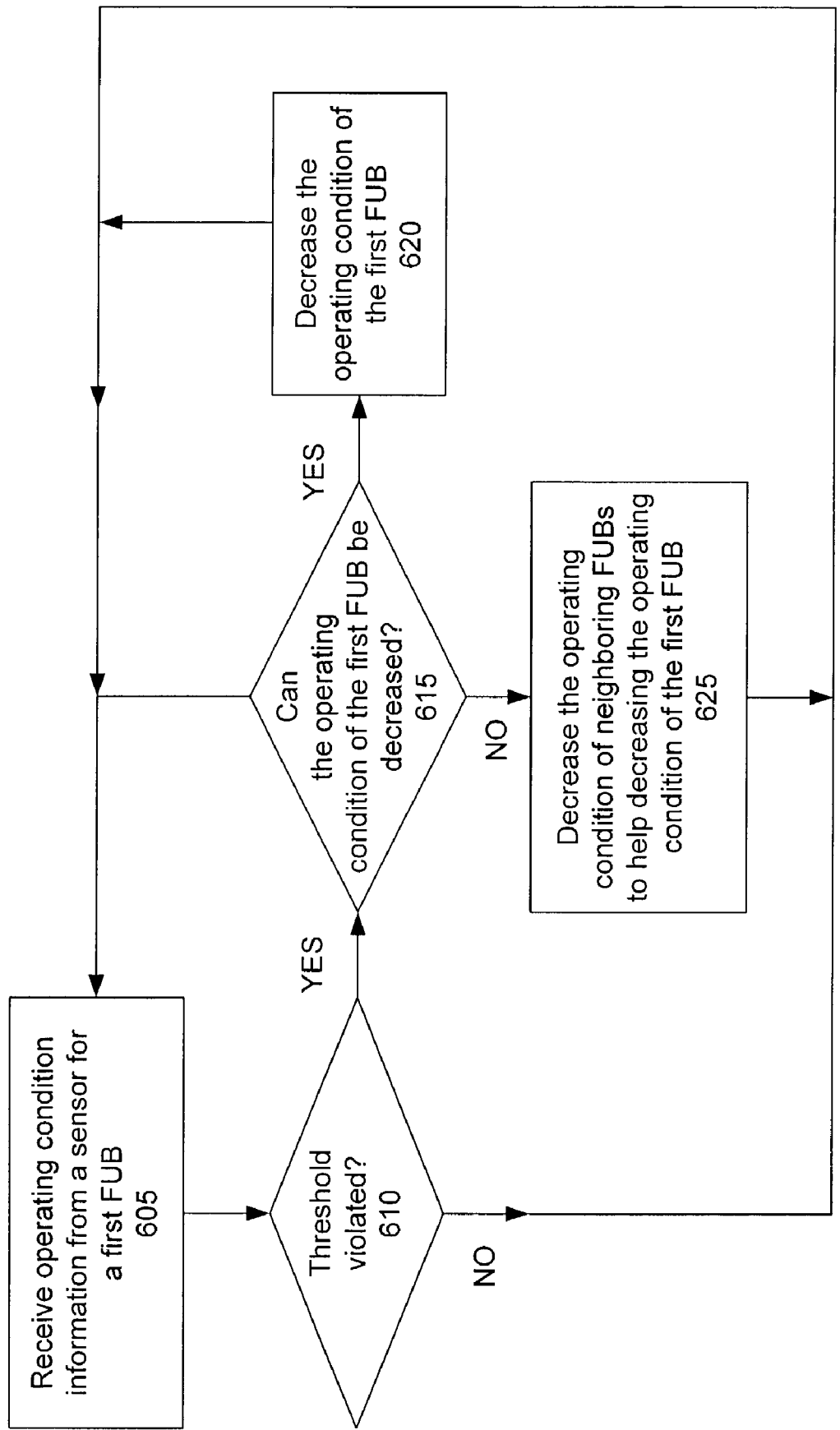
FIG. 6 is a flow diagram illustrating an example of a process used to manage operation of a FUB by managing one or more neighboring FUBs, according to one embodiment.

FIG. 6 is a flow diagram illustrating an example of a process used to manage operating condition of a FUB by managing one or more neighboring FUBs, according to one embodiment. At block 605, the controller receives operating condition information of a first FUB from a sensor. Based on the operating condition information, a test is made to determine if a threshold is violated, as shown in block 610. When the threshold is not violated, the process flows to block 605 where the controller receives updated operating condition information from the sensor. When the threshold is violated, the process flows to block 615 where a test is made to determine if the operating condition of the first FUB may be adjusted (e.g., decreased). When the operating condition of the first FUB may be adjusted, the process flows to block 620 to perform such operations. When the operating condition of the first FUB may not be adjusted, the process flows from block 615 to block 625.

At block 625, the controller adjusts the operating condition of the one or more FUBs that neighbor the first FUB. For example, when the temperature of the first FUB violates a temperature threshold, it may be possible to indirectly reduce the temperature of the first FUB by reducing the temperature of its neighboring FUBs. The process then continues at block 605 where the controller receives updated operating condition information from the sensor.

Figure 7:
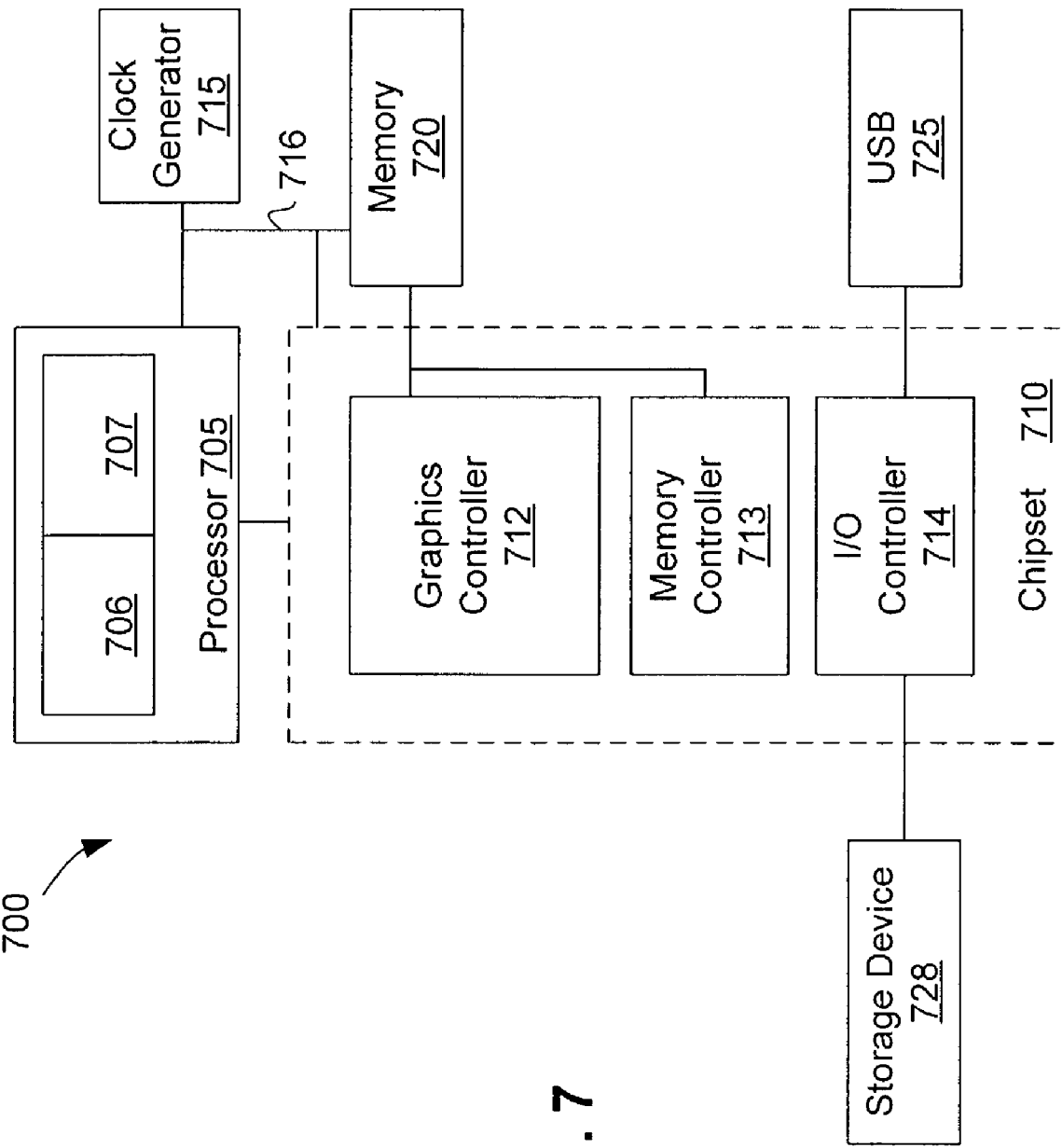
FIG. 7 is a block diagram illustrating an example of a computer system.

FIG. 7 is a block diagram illustrating an example of a computer system. The computer system 700 may include multiple components such as, for example, a central processing unit (CPU) or processor 705, a chipset 710, and a memory 720. Although not shown, there may also be other components. The memory 720 and the chipset 710 may be coupled to the processor 705 via bus 716. The memory 720 may be random access memory, read only memory, a persistent storage memory, such as mass storage device or any combination of these devices.

The processor 705 may or may not include multiple logical processors. For example, the processor 705 may support HyperThreading Technology (HT) and may include two logical processors 706 and 707. The chipset 710 may include a graphics controller 712, a memory controller 713, and an input output (I/O) controller 714. Clock generator 715 may provide clock signals to the processor 705, the chipset 710, and the memory 720. It may also provide clock signals to other components in the computer system 700. Each of these components may include multiple FUBs, and the operating condition of each of the FUBs may be individually managed, as described above. The computer system 700 may be powered by an alternating current (AC) power source (not shown) or by a direct current (DC) power source (not shown) using one or more batteries.

The computer system 700 may include a storage device 728 that may include a machine-readable medium on which is stored sequences of instructions (e.g., software application) embodying any one, or all, of the embodiments described herein. Execution of the sequences of instruction may cause the processor 705 to perform operations according to embodiments of the invention. The sequences of instructions may be loaded into the memory 720 from the storage device 728 or from one or more other digital processing systems (e.g. a server computer system) over a network connection (not shown). The sequences of instructions may be stored concurrently in several storage devices (e.g. DRAM and a hard disk, such as virtual memory). The sequences of instructions may also reside, completely or at least partially, within the memory 720 and/or within the processor 705.

In other embodiments, hard-wired circuitry may be used in place of or in combination with the sequences of instructions to implement various aspects of the invention. Thus, the present invention is not limited to any specific combination of hardware circuitry and software, nor to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:
    monitoring one or more functional unit blocks (FUB) of a component using a sensor associated with each of the one or more FUBs; and
    when a sensor associated with a first FUB of the component detects that the first FUB violates an operating threshold, adjusting operating condition of the first FUB if the operating condition of the first FUB can be adjusted, otherwise adjusting operating condition of a second FUB of the component, the second FUB being a neighbor of the first FUB, wherein if a third FUB of the component depends on the first FUB and the operating condition of the first FUB is adjusted, then the operating condition of the third FUB is adjusted.

2. The method of claim 1, wherein the component is capable of generating heat.

3. The method of claim 2, wherein the component is a processor or a chipset.

4. The method of claim 1, wherein operating condition of a fourth FUB of the component is not impacted by adjusting the operating condition of the first FUB of the component.

5. The method of claim 1, wherein the sensor is a thermal sensor, and wherein the operating threshold is a temperature threshold.

6. The method of claim 1, wherein adjusting operating condition of the first FUB comprises:
    throttling frequency applied to the first FUB.

7. The method of claim 6, wherein adjusting operating condition of the first FUB further comprises:
    throttling voltage applied to the first FUB.

8. The method of claim 1, wherein adjusting operating condition of the first FUB comprises:
    throttling power consumption of the first FUB.

9. A system, comprising:
    a heat-generating component having multiple functional unit blacks (FUBs), each of the FUBs associated with a sensor to monitor its operating condition; and
    a controller coupled to the heat-generating component, the controller is to manage operating condition of each of the multiple FUBs based on operating condition information provided by the sensor associated with each of the multiple FUBs, wherein when operating condition of a first FUB violates a threshold, the controller is to manage the operating condition of the first FUB by throttling the operating condition of the first FUB or throttling operating condition of a second FUB when it is not desirable to throttle the operating condition of the first FUB.

10. The system of claim 9, wherein the controller and the heat-generating component share a single die.

11. The system of claim 9, wherein the controller and the heat-generating component are on different dies.

12. The system of claim 9, wherein the sensor is a thermal sensor, and wherein when the operating condition information of a first FUB detected by its corresponding thermal sensor indicates that temperature of the first FUB violates a temperature threshold, the controller is to manage the operating condition of the first FUB by reducing the temperature of the first FUB.

13. The system of claim 9, wherein the controller throttles the operating condition of the first FUB instead of throttling operating condition of the heat-generating component.

14. The system of claim 9, wherein the controller further throttles operating condition of a third FUB when the third FUB depends on the first FUB.

15. A computer readable medium comprising executable instructions which, when executed in a processing system, causes the processing system to perform a method, comprising:

monitoring one or more functional unit blocks (FUB) of a component using a sensor associated with each of the one or more FUBs; and when a sensor associated with a first FUB of the component detects that the first FUB violates an operating threshold, adjusting operating condition of the first FUB if the operating condition of the first FUB can be adjusted, otherwise adjusting operating condition of a second FUB of the component, the second FUB being a neighbor of the first FUB, wherein if a third FUB of the component depends on the first FUB and the operating condition of the first FUB is adjusted, operating condition of the third FUB is adjusted.

16. The computer readable medium of claim 15, wherein the component is capable of generating heat.

17. The computer readable medium of claim 16, wherein the component is a processor or a chipset.

18. The computer readable medium of claim 15, wherein operating condition of a fourth FUB of the component is not impacted by adjusting operating condition of the first FUB of the component.

19. The computer readable medium of claim 15, wherein the sensor is a thermal sensor, and wherein the operating threshold is a temperature threshold.

20. The computer readable medium of claim 15, wherein adjusting operating condition of the first FUB or of the second FUB, comprises:

throttling frequency applied to the first FUB or to the second FUB.

21. The computer readable medium of claim 20, wherein adjusting operating condition of the first FUB or of the second FUB, further comprises:

throttling voltage applied to the first FUB or to the second FUB.

22. The computer readable medium of claim 15, wherein adjusting operating condition of the first FUB or of the second FUB, comprises:

throttling power consumption of the first FUB or of the second FUB.

* * * * *